United States Patent
Andler

(10) Patent No.: US 8,360,647 B2
(45) Date of Patent: Jan. 29, 2013

(54) PLAIN BEARING COMPOSITE MATERIAL, USE THEREOF AND PRODUCTION METHODS THEREFOR

(75) Inventor: Gerd Andler, Bad Schwalbach (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 864 days.

(21) Appl. No.: 11/914,350

(22) PCT Filed: May 13, 2006

(86) PCT No.: PCT/EP2006/004505
§ 371 (c)(1),
(2), (4) Date: Jun. 2, 2008

(87) PCT Pub. No.: WO2006/120016
PCT Pub. Date: Nov. 16, 2006

(65) Prior Publication Data
US 2009/0263053 A1    Oct. 22, 2009

(30) Foreign Application Priority Data
May 13, 2005   (DE) .......................... 10 2005 023 308

(51) Int. Cl.
*F16C 33/02* (2006.01)
*C22C 9/05* (2006.01)

(52) U.S. Cl. .......................... 384/276; 384/907; 420/487

(58) Field of Classification Search .......... 384/276–280, 384/907, 912, 913; 428/677; 420/485, 487
See application file for complete search history.

(56) References Cited

U.S. PATENT DOCUMENTS

| | | | |
|---|---|---|---|
| 1,658,186 A | | 2/1928 | Corson |
| 2,137,282 A | | 11/1938 | Hensel et al. |
| 2,185,958 A | | 1/1940 | Strang et al. |
| 2,241,815 A | | 5/1941 | Hensel et al. |
| 5,162,100 A | * | 11/1992 | Tanaka et al. .................. 384/912 |
| 5,209,578 A | | 5/1993 | Eastham et al. |
| 5,300,368 A | * | 4/1994 | Kubert et al. .................. 384/912 |
| 5,482,782 A | | 1/1996 | Tanaka et al. |
| 5,675,883 A | * | 10/1997 | Gaag et al. ..................... 420/485 |
| 5,955,202 A | * | 9/1999 | Steeg et al. .................... 384/912 |
| 6,273,972 B1 | | 8/2001 | Andler |
| 6,316,061 B1 | * | 11/2001 | Andler et al. .................. 427/566 |
| 6,416,877 B1 | * | 7/2002 | Perrin et al. ................... 384/912 |
| 6,475,635 B1 | | 11/2002 | Sakai et al. |
| 6,492,039 B2 | * | 12/2002 | Huhn et al. .................... 384/912 |
| 6,609,830 B2 | * | 8/2003 | Bank et al. ..................... 384/276 |
| 2001/0016267 A1 | | 8/2001 | Huhn et al. |
| 2003/0059137 A1 | | 3/2003 | Kawagoe et al. |
| 2003/0099853 A1 | * | 5/2003 | Takayama et al. ............. 384/912 |
| 2003/0209103 A1 | * | 11/2003 | Takayama et al. ............. 428/676 |
| 2003/0235355 A1 | * | 12/2003 | Hiramatsu et al. ............. 384/276 |
| 2004/0166017 A1 | * | 8/2004 | Caron et al. .................... 420/492 |
| 2004/0241489 A1 | * | 12/2004 | Kawachi et al. ............... 384/912 |
| 2010/0068557 A1 | * | 3/2010 | Andler ............................ 428/677 |
| 2010/0323218 A1 | * | 12/2010 | Wilhelm et al. ............... 428/674 |

FOREIGN PATENT DOCUMENTS

| | | |
|---|---|---|
| AT | 389 356 B | 11/1989 |
| DE | 592708 | 1/1934 |
| DE | 1191114 | 4/1965 |
| DE | 15 58 474 A1 | 3/1970 |
| DE | 28 53 774 | 7/1980 |
| DE | 36 42 825 C1 | 1/1988 |
| DE | 4103117 C2 | 11/1993 |
| DE | 43 28 920 A1 | 4/1994 |
| DE | 43 28 921 A1 | 4/1994 |
| DE | 44 15 629 C1 | 8/1995 |
| DE | 195 25 330 A1 | 1/1997 |
| DE | 195 25 330 C2 | 7/1998 |
| DE | 19514836 C2 | 6/2000 |
| GB | 669344 | 4/1952 |
| GB | 2384007 | 7/2003 |

* cited by examiner

*Primary Examiner* — James Pilkington
(74) *Attorney, Agent, or Firm* — Robert L. Stearns; Dickinson Wright, PLLC

(57) ABSTRACT

The invention relates to a plain bearing composite material with a supporting layer made of steel, a bearing metal layer made of a copper alloy, and with a lining applied to the bearing metal layer. The copper alloy can contain 0.5 5% by weight of nickel, 0.2 to 2.5% by weight of silicon and =0.1% by weight of lead. The lining can be an electrodeposited layer, a sputtered layer or a plastic layer. The invention also relates to methods for producing this composite material.

32 Claims, No Drawings

PLAIN BEARING COMPOSITE MATERIAL, USE THEREOF AND PRODUCTION METHODS THEREFOR

RELATED APPLICATIONS

This application is related to other applications filed on the same date herewith under application Ser. No. 11/914,352, application Ser. No. 11/914,356, and application Ser. No. 11/914,360.

BACKGROUND OF THE INVENTION

1. Technical Field

The invention relates to a plain bearing composite material. The invention further relates to a use thereof and production methods therefor.

2. Related Art

Known from DE 44 15 629 C1 is the use of a copper-nickel-silicon alloy for producing wear-resistant objects with emergency running properties such as, for example, cast pistons for pressure casting machines. The alloy described in DE 44 15 629 C1 consists of 1-4% nickel, 0.1-1.5% silicon and with the remainder being copper, and is used as a solid material.

U.S. Pat. No. 2,137,282 describes an alloy comprising 0.1-30% nickel, 0.05-3% silicon and the remainder copper. Following appropriate heat treatment, this alloy is distinguished by high hardnesses and good electrical conductivities.

U.S. Pat. No. 1,658,186 describes a copper-nickel-silicon alloy, where silicides acting as hard particles are discussed in detail. Various heat treatment methods are also specified for adjusting the hardness.

Another copper-nickel-silicon alloy is found in U.S. Pat. No. 2,241,815 where the nickel fraction is 0.5-5% and the silicon fraction is 0.1-2%.

U.S. Pat. No. 2,185,958 describes alloys comprising 1% nickel, 3.5% silicon and the remainder copper, as well as 1.5% silicon and 1% nickel and the remainder copper.

DE 36 42 825 C1 discloses a plain bearing material comprising 4 to 10% nickel, 1-2% aluminium, 1-3% tin and the remainder copper as well as the usual impurities, which should have a high strength and long lifetime. Solid material bushings are produced from this plain bearing material.

GB 2384007 describes a plain bearing composite material with a steel back on which a sintered layer of a copper alloy is applied, having a maximum hardness of 130 HV. The copper alloy comprises 1-11 wt. % tin, up to 0.2 wt. % phosphorus, maximum 10 wt. % nickel or silver, maximum 25 wt. % lead and bismuth.

Plain bearing elements made of solid material have the disadvantage that in order to ensure a press fit in the housing, they must have a very high strength and therefore hardness. In applications where adaptability of the bearing metal is required during local wear of the lining, for example, such materials tend to exhibit increased corrosion or result in damage to the shaft.

A further disadvantage is that as a result of the different coefficients of thermal expansion, the plain bearing element expands more strongly in a steel housing and thus the play is disadvantageously reduced.

SUMMARY OF THE INVENTION

It is the object of the invention to provide a plain bearing composite material whose mechanical and tribological properties can be adapted to the desired requirements, whereby the required stiffness for the press fit is ensured at the same time. In addition, plain bearing elements made of this plain bearing composite material should be particularly suitable for insertion in steel housings. It is also an object to provide a use and production methods.

DETAILED DESCRIPTION

It has been shown that copper alloys with nickel-silicon can be adjusted over a wide range with regard to their mechanical and tribological properties so that it is possible to adapt to the required properties.

As a result of its stiffness, the steel back ensures the required press fit so that the structure of the bearing material can be adjusted independently of the strength requirements. The claimed copper alloys can thus be configured, for example, with regard to their structure so that they lie in a comparable range to the classical lead-bronze bearings regarding their strength and hardness as well as their tribological properties such as corrosion behaviour.

Overall the area of usage of the plain bearing composite material is substantially extended.

The composite materials with steel backs also have advantages in applications with steel housings as a result of their coefficient of thermal expansion.

The tribological properties of the bearing metal are preferably adjusted by a thermo-mechanical treatment, in particular by rolling and annealing.

Such thermo-mechanical treatment of the composite material can be configured in such a manner that the properties of the steel required for the finished part are not impaired.

According to a first alternative, the production method according to the invention comprises the following process steps:

Producing strip material from a copper-nickel-silicon alloy and cladding by rolling the strip material on a supporting layer of steel to produce a composite. In this case, the bearing metal and/or steel is deformed by 20-70%.

The subsequent thermo-mechanical treatment comprises the following steps: a first annealing of the composite at 550° C. to 700° C. for 2 to 5 hours, at least one first rolling of the composite, wherein a degree of deformation of 20-30% is implemented, at least one second annealing at 500° C.-600° C. for >1 h, optionally a second rolling of the composite, where a maximum degree of deformation of 30% is implemented, followed by a third annealing at temperatures >500° C. for at least 1 h.

According to a further alternative, the copper alloy is applied to the supporting layer and is sintered or cast-on. The yield point of the bearing metal is adjusted by means of the first or the second rolling step in combination with the subsequent annealing, where the yield point of the bearing metal is preferably 150 to 250 MPa.

If the final dimension has not been reached after the second annealing, the thermo-mechanical treatment is ended. In this case, the yield point is adjusted by the first rolling and the second annealing.

If the final dimension has not yet been achieved after the second annealing, this is followed by the second rolling and a third annealing step, whereby the yield point is adjusted to the specified value.

The structure after the thermo-mechanical treatment is distinguished by fine, uniformly isotropically distributed intermetallic NiSi-based precipitations within the copper matrix.

Said yield point of the bearing metal lies significantly below that of steel, which is possible because the steel supporting layer provides the required press fit here. The advantage of the composite materials according to the invention is that the yield point of the bearing metal can be lowered so far until the desired tribological properties, in particular the adaptability of the bearing metal layer, are achieved, e.g. that no wear or only slight wear of the counter-running part occurs.

Sheet bars are separated from the composite to produce plain bearing elements following coil slitting and the sheet bars are deformed by known deforming steps to form plain bearing elements. The final process is preferably the machining of the plain bearings and the application of the lining.

The lining is applied by means of galvanic deposition, PVD processes, in particular sputtering or other processes specified in the claims, optionally after applying an intermediate layer. Optionally, a lead-in layer is also applied to the lining.

The tribological properties of the composite material are further improved by the lining.

In the copper-nickel-silicon alloy, the nickel fraction is 0.5-5 wt. %, preferably 1.0 to 3.0 wt. %, in particular 1.5 to 2.2 wt. % and the silicon fraction is 0.2-2.5 wt. %, preferably 0.4 to 1.2 wt. % or 0.5 to 1.5 wt. %.

The copper-nickel-silicon alloy can contain 0.05-2.0 wt. % manganese, preferably 0.15-1.5 wt. %.

It has been shown that if the weight ratio of nickel to silicon is between 2.5 and 5 (nickel silicon=2.5 to 5), the tribological properties can be improved, in particular corrosion of the bearing material can be reduced significantly. With these weight ratios the nickel-silicon compounds responsible for the good tribological properties are favoured and formed in sufficient measure.

The copper alloys can contain further micro-alloying elements. The supporting layer preferably contains 0.05-0.4 wt. %, preferably 0.075 to 0.25 wt. % of at least one micro-alloying element. Possible micro-alloying elements are, for example, chromium, titanium, zirconium, zinc and magnesium, individually or in combination.

Preferably a compound clad by rolling exists between the bearing metal layer and the supporting layer optionally via an intermediate layer. Copper or a copper alloy such as, for example, a copper-zinc alloy or a copper-tin alloy can be used for the intermediate layer.

The bearing metal layer can also be a sintered layer or a cast layer, where sintering temperatures between 600° C. and 800° C. over 10-30 min or casting temperatures of 1000° C. to 1250° C. are used. A first annealing is integrated in the sintering process.

It is furthermore advantageous if the lining consists of an electroplated layer. Electroplated layers are multifunctional materials which are characterised, inter alia, by good embedding properties for foreign particles, by lead-in properties or matching to sliding partners, as corrosion protection and by good emergency running properties in cases of oil deficiency. In particular, when using low-viscosity oils, electroplated layers are advantageous because mixed friction states in which said properties have an effect can occur more frequently in this case.

The electroplated layer preferably consists of lead-tin-copper, tin-copper, bismuth-copper alloy or of pure bismuth.

In the lead-tin-copper alloys the fraction of tin is preferably 4-20 wt. % and the fraction of copper is 1-10 wt. %. In the bismuth-copper alloys the preferred fractions of copper are 1-20 wt. %.

The lining can be applied by means of a thermal coating method. Possible thermal coating methods are plasma spraying, high-speed flame spraying and cold gas spraying.

A further preferred method is the PVD method and in this case in particular, sputtering. Sputtered layers preferably consist of aluminium-tin alloys, aluminium-tin-copper alloys, aluminium-tin-nickel-manganese alloys, aluminium-tin-silicon alloys or aluminium-tin-silicon-copper alloys.

In these alloys, the tin fraction is preferably 8-40 wt. %, the copper fraction 0.5-4.0 wt. %, the silicon fraction 0.02-5.0 wt. %, the nickel fraction 0.02-2.0 wt. % and the manganese fraction 0.02-2.5 wt. %.

According to a further embodiment, the lining can consist of a plastic layer. Plastic layers are preferably applied by means of a varnishing or printing process such as, for example, screen or pad printing, by dipping or spraying.

The surface to be coated must be suitably prepared for this purpose by degreasing, chemical or physical activation and/or mechanical roughening, for example, by sand blasting or grinding.

The matrix of the plastic layers preferably consists of high-temperature-resistant resins such as PAI. In addition, additives such as $MoS_2$, boron nitride, PTFE or graphite can be embedded in the matrix. The fractions of additives can preferably lie between 5 and 50 vol. % individually or in combination.

In order to improve the binding, preferably at least one intermediate layer is arranged between the bearing metal layer and the lining. This intermediate layer can also be an electro-plated layer even if the lining is applied by means of a sputtering process.

The electro-plated intermediate layer can preferably contain nickel or silver or consist of these elements. It is also possible to apply two intermediate layers of nickel and tin-nickel.

Instead of electro-plated intermediate layers, sputtered intermediate layers can also be provided. In this case, nickel alloy layers, for example, comprising NiCu30, pure nickel layers, nickel-chromium layers preferably containing 15-25% chromium, zinc layers, zinc alloy layers, chromium and copper layers, nickel-chromium alloy layers, nickel-copper alloy layers, copper alloy layers or chromium-nickel alloy layers are preferred.

The thickness of the bearing metal layer is preferably 0.1-0.8 mm, preferably 0.1-0.5 mm, in particular 0.15-0.35 mm.

The preferred thickness of the intermediate layer is 1-12 µm, preferably 0.5-7.0 µm, in particular 1.0-4.0 µm and the thickness of the lining is 4-30 µm, preferably 8-20 µm, in particular 10-16 µm.

The thickness of the lead-in layer is 0.2-12 µm, preferably 0.2 to 6 µm, in particular 0.2 to 3 µm.

Preferred uses of plain bearing composite materials are those for plain bearing shells.

Exemplary copper alloys are:

TABLE 1

| Example | 1 | 2 | 3 | 4 | 5 |
|---------|---|---|---|---|---|
| Ni | 1.9 | 1.5 | 0.8 | 3.8 | 2.8 |
| Si | 0.6 | 0.5 | 0.25 | 1.2 | 0.8 |
| Mn | 0.15 | 0.05 | 0.05 | 0.1 | 0.05 |
| Pb | <0.1 | <0.1 | <0.1 | <0.1 | <0.1 |
| Cr |  | 0.15 |  |  | 0.15 |
| Ti |  |  |  | 0.15 |  |
| Zr |  |  | 0.2 |  | 0.15 |
| Cu | Remainder | Remainder | Remainder | Remainder | Remainder |

(values in wt. 5)

An exemplary process provides the following process steps:
- continuous casting of a copper alloy, in particular double continuous casting, having a width of 300 mm and a thickness of 100 mm to produce strip material
- bilateral milling and subsequent winding of the strip material,
- rolling and annealing operations as far as the dimensions for cladding by rolling.

The strip material is mechanically pre-treated, e.g. by brushing, and applied to the steel trip by cladding by means of rolling. The steel strip has a width of 300 mm and a thickness of 4.5 mm. The cladding by rolling with the copper alloy results in a degree of deformation of 50-70%.

This is followed by a first annealing step in a bell-type furnace at 550° C. over 2 hours. A first rolling is then carried out in a rolling step, whereby the thickness of the composite is reduced by 28%, which corresponds to the final dimension.

The composite is then annealed at 550° C. for 2 h. This is followed by coil slitting with dimensions of 95 mm wide× 1.56 mm thick.

The yield point of the bearing metal in this example is about 150-170 MPa. According to a further process variant, the copper alloy is scattered as powder on the steel strip and sintered on by means of at least one sintering process at 680° C. for 10-20 min in a protective gas atmosphere.

According to a further alternative method, the copper alloy is poured at a temperature of 1000° C. to 1250° C. onto the steel strip which is preferably preheated above 1000° C. Cooling then takes to below 100° C. within 1 to 5 min, in particular 2 to 4 min.

The subsequent rolling and annealing steps are the same as in the alternative method of cladding by rolling.

Examples of electro-plated linings are given in Table 2.

TABLE 2

| Example | 1 | 2 | 3 | 4 | 5 |
|---|---|---|---|---|---|
| Lead | 88 | 78 | | | |
| Tin | 10 | 14 | 94 | | |
| Bismuth | | | | 100 | 95 |
| Copper | 2 | 8 | 8 | | 5 |

(values in wt. %)

A preferred electro-plated lining comprises a tin matrix in which tin-copper particles are embedded comprising 39-55 wt. % copper and the remainder tin. The particle diameter is preferably 0.5 μm to 3 μm. This electro-plated layer is preferably applied to two intermediate layers where the first intermediate layer preferably consists of Ni and the second intermediate layer located thereabove consists of nickel and tin. The Ni fraction of the second intermediate layer is 30-40 wt. % Ni. The first intermediate layer has a thickness of 1 to 4 μm and the second intermediate layer has a thickness of 2 to 7 μm.

Examples of sputtered layers are given in Table 3

TABLE 3

| Example | 1 | 2 | 3 | 4 | 5 |
|---|---|---|---|---|---|
| Al | Remainder | Remainder | Remainder | Remainder | Remainder |
| Sn | 22 | 35 | 25 | 10 | 20 |
| Cu | 0.7 | 1.2 | 0.7 | 0.5 | 0.5 |
| Si | | | 2.5 | | 1.5 |
| Mn | | | | 1.5 | |
| Ni | | | | 0.7 | 0.7 |

(values in wt. %)

Examples of plastic linings are given in Table 4.

TABLE 4

| Example | 1 | 2 | 3 | 4 | 5 |
|---|---|---|---|---|---|
| PAI | 70 | 80 | 70 | 75 | 65 |
| MoS2 | 30 | | | | 20 |
| BN | | 20 | | | |
| Graphite | | | 30 | | |
| PTFE | | | | 25 | 15 |

(values in vol. %)

All these linings can be combined with bearing metal layers of copper alloys.

Lead-in layers on these layer combinations can be pure tin or indium layers as well as all said electro-plated and plastic layers, where the lead-in layer is preferably to be selected so that it is softer than the lining used.

The invention claimed is:

1. A plain bearing composite material, comprising:
a supporting layer made of steel,
a bearing metal layer made of a copper alloy containing copper, 0.5-5 wt. % nickel, 0.2-2.5 wt. % silicon, and <0.1 wt. % lead, the bearing metal layer being cast onto the supporting layer and having a yield point of 150 to 250 MPa,
a lining including an electroplated layer applied to the bearing metal layer, the electroplated layer including a tin-copper alloy, and
the plain bearing composite material being formed by continuous casting the bearing metal layer onto the supporting layer, rolling, and annealing the bearing metal layer on the supporting layer, wherein the rolling and annealing steps provide the yield point of 150 to 250 MPa.

2. The plain bearing composite material according to claim 1, wherein the copper alloy contains 0.05-2 wt. % manganese.

3. The plain bearing composite material according to claim 1 wherein the weight ratio of nickel to silicon lies between 2.5 and 5.

4. The plain bearing composite material according to claim 1, wherein the bearing metal layer contains 0.05-0.4 wt. % of at least one micro-alloying element.

5. The plain bearing composite material according to claim 4, wherein micro-alloying elements are chromium, titanium, zirconium, zinc or magnesium.

6. The plain bearing composite material according to claim 1, wherein at least one intermediate layer is arranged between the bearing metal layer and the lining.

7. The plain bearing composite material according to claim 6, wherein the intermediate layer is an electro-plated layer.

8. The plain bearing composite material according to claim 6, wherein two intermediate layers of nickel and tin-nickel are provided.

9. The plain bearing composite material according to claim 6, wherein the intermediate layer consists of nickel or silver.

10. The plain bearing composite material according to claim 6, wherein the intermediate layer is a sputtered layer.

11. The plain bearing composite material according to claim 6, wherein the intermediate layer consists of either a nickel alloy, a nickel-chromium alloy, nickel-copper alloy, zinc alloy, zinc, chromium, copper, copper-alloy, nickel, chromium-nickel alloy or nickel-chromium.

12. The plain bearing composite material according to claim 6, wherein the thickness of the intermediate layer is 1-12 μm.

13. The plain bearing composite material according to claim 1, wherein a lead-in layer is provided on the lining.

14. The plain bearing composite material according to claim 13, wherein the lead-in layer consists of either tin, lead, copper or indium or as a plastic layer.

15. The plain bearing composite material according to claim 13, wherein the thickness of the lead-in layer is 0.2 to 12 µm.

16. The plain bearing composite materials according to claim 1, wherein the thickness of the bearing metal layer is 0.1-0.8 mm.

17. The plain bearing composite material according to claim 1, wherein the thickness of the lining is 4-30 µm.

18. The plain bearing composite material according to claim 1 applied to a plain bearing shell.

19. The plain bearing composite material according to claim 1, wherein the bearing metal layer has a degree of deformation of 20% to 70% and includes intermetallic Ni—Si-based precipitations isotropically distributed in a copper matrix, and
wherein the annealing step is conducted at 500° C. to 700° C. and the rolling and annealing steps provide the yield point of 150 to 250 MPa and the degree of deformation of 20% to 70% and the isotropically distributed intermetallic Ni—Si-based precipitations in the copper matrix of the bearing metal layer.

20. A plain bearing composite material, comprising:
a supporting layer made of steel,
a bearing metal layer made of a copper alloy containing copper, 0.5-5 wt. % nickel, 0.2-2.5 wt. % silicon, and <0.1 wt. % lead, the bearing metal layer being roll bonded onto the supporting layer and having a yield point of 150 to 250 MPa,
a lining including a sputtered layer applied to the bearing metal layer by means of a PVD-process, the sputtered layer including either an aluminum-tin-silicon alloy, aluminum-tin-copper alloy, an aluminum-tin-silicon-copper alloy or an aluminum-tin-nickel-manganese alloy, and
the plain bearing composite material being formed by roll bonding the bearing metal layer onto the supporting layer, rolling, and annealing the roll-bonded bearing metal layer on the supporting layer to form a compound clad, wherein the roll bonding, rolling, and annealing steps provide the yield point of 150 to 250 MPa.

21. The plain bearing composite material according to claim 20, wherein the bearing metal layer has a degree of deformation of 20% to 70% and includes intermetallic Ni—Si-based precipitations isotropically distributed in a copper matrix, and
wherein the annealing step is conducted at 500° C. to 700° C. and the roll bonding, rolling, and annealing steps provide the yield point of 150 to 250 MPa and the degree of deformation of 20% to 70% and the isotropically distributed intermetallic Ni—Si-based precipitations in the copper matrix of the bearing metal layer.

22. A plain bearing composite material, comprising:
a supporting layer made of steel,
a bearing metal layer made of a copper alloy containing copper, 0.5-5 wt. % nickel, 0.2-2.5 wt. % silicon, and <0.1 wt. % lead, the bearing metal layer being cast onto the supporting layer and having a yield point of 150 to 250 MPa,
a lining including a sputtered layer applied to the bearing metal layer by means of a PVD process, the sputtered layer including either an aluminum-tin-silicon alloy, aluminum-tin-copper alloy or an aluminum-tin-nickel-manganese alloy, and
the plain bearing composite material being formed by continuously casting the bearing metal layer onto the supporting layer, rolling, and annealing the bearing metal layer on the supporting layer, wherein the rolling and annealing steps provide the yield point of 150 to 250 MPa.

23. The plain bearing composite material according to claim 22, wherein the bearing metal layer has a degree of deformation of 20% to 70% and includes intermetallic Ni—Si-based precipitations isotropically distributed in a copper matrix, and
wherein the annealing step is conducted at 500° C. to 700° C. and the rolling and annealing steps provide the yield point of 150 to 250 MPa and the degree of deformation of 20% to 70% and the isotropically distributed intermetallic Ni—Si-based precipitations in the copper matrix of the bearing metal layer.

24. A plain bearing composite material, comprising:
a supporting layer made of steel,
a bearing metal layer made of a copper alloy containing copper, 0.5-5 wt. % nickel, 0.2-2.5 wt. % silicon, and <0.1 wt. % lead, the bearing metal layer being cast onto the supporting layer and having a yield point of 150 to 250 MPa,
a lining including a plastic layer applied to the bearing metal layer, and
the plain bearing composite material being formed by continuously casting the bearing metal layer onto the supporting layer, rolling, and annealing the bearing metal layer on the supporting layer, wherein the rolling and annealing steps provide the yield point of 150 to 250 MPa.

25. The plain bearing composite material according to claim 24, wherein the lining has a matrix consisting of: high-temperature-resistant resin such as PAI.

26. The plain bearing composite material according to claim 25, wherein the plastic lining includes at least one filler selected from the group consisting of: $MoS_2$, boron nitride, PTFE or graphite.

27. The plain bearing composite material according to claim 26, wherein the fillers are present individually or in combination as 5-50 vol. %.

28. The plain bearing composite material according to claim 24, wherein the bearing metal layer has a degree of deformation of 20% to 70% and includes intermetallic Ni—Si-based precipitations isotropically distributed in a copper matrix, and
wherein the annealing step is conducted at 500° C. to 700° C. and the rolling and annealing steps provide the yield point of 150 to 250 MPa and the degree of deformation of 20% to 70% and the isotropically distributed intermetallic Ni—Si-based precipitations in the copper matrix of the bearing metal layer.

29. A plain bearing composite material, comprising:
a supporting layer made of steel,
a bearing metal layer made of a copper alloy containing copper, 0.5-5 wt. % nickel, 0.2-2.5 wt. % silicon, and <0.1 wt. % lead, the bearing metal layer being roll bonded onto the supporting layer and having a yield point of 150 to 250 MPa,
a lining including a plastic layer applied to the bearing metal layer, and
the plain bearing composite material being formed by roll bonding the bearing metal layer onto the supporting layer, rolling, and annealing the roll-bonded bearing metal layer on the supporting layer to form a compound clad, wherein the roll bonding, rolling, and annealing steps provide the yield point of 150 to 250 MPa.

30. The plain bearing composite material according to claim 29, wherein the bearing metal layer has a degree of deformation of 20% to 70% and includes intermetallic Ni—Si-based precipitations isotropically distributed in a copper matrix, and wherein the annealing step is conducted at 500° C. to 700° C. and the roll bonding, rolling, and annealing steps provide the yield point of 150 to 250 MPa and the degree of deformation of 20% to 70% and the isotropically distributed intermetallic Ni—Si-based precipitations in the copper matrix of the bearing metal layer.

31. A plain bearing composite material, comprising:

a supporting layer made of steel, a bearing metal layer made of a copper alloy containing copper, 0.5-5 wt. % nickel, 0.2-2.5 wt. % silicon, and <0.1 wt. % lead, the bearing metal layer being roll bonded onto the supporting layer and having a yield point of 150 to 250 MPa, a lining including an electroplated layer applied to the bearing metal layer, the electroplated layer including a tin-copper alloy, and the plain bearing composite material being formed by roll bonding the bearing metal layer onto the supporting layer, rolling, and annealing the roll-bonded bearing metal layer on the supporting layer to form a compound clad, wherein the roll bonding, rolling, and annealing steps provide the yield point of 150 to 250 MPa.

32. The plain bearing composite material according to claim 31, wherein the bearing metal layer has a degree of deformation of 20% to 70% and includes intermetallic Ni—Si-based precipitations isotropically distributed in a copper matrix, and wherein the annealing step is conducted at 500° C. to 700° C. and the roll bonding, rolling, and annealing steps provide the yield point of 150 to 250 MPa and the degree of deformation of 20% to 70% and the isotropically distributed intermetallic Ni—Si-based precipitations in the copper matrix of the bearing metal layer.

* * * * *

UNITED STATES PATENT AND TRADEMARK OFFICE
CERTIFICATE OF CORRECTION

PATENT NO. : 8,360,647 B2
APPLICATION NO. : 11/914350
DATED : January 29, 2013
INVENTOR(S) : Andler It is certified that error appears in the above-identified patent and that said Letters Patent is hereby corrected as shown below:

In the Specification

Column 3, Line 27 "(nickel silicon)" should read "(nickel : silicon)"

In the Claims

Column 6, "to claim 6, wherein two" should read "to claim 7, wherein two"

Signed and Sealed this
Seventh Day of May, 2013

Teresa Stanek Rea
*Acting Director of the United States Patent and Trademark Office*